(12) United States Patent
Halverson et al.

(10) Patent No.: US 10,227,094 B1
(45) Date of Patent: Mar. 12, 2019

(54) AERODYNAMIC DRAG REDUCTION SYSTEM FOR TRUCKS, CARGO TRAILERS AND TRAIN BOXCARS

(71) Applicants: Rick Halverson, Willard, MO (US); Charles W. Denison, Springfield, MO (US)

(72) Inventors: Rick Halverson, Willard, MO (US); Charles W. Denison, Springfield, MO (US)

( * ) Notice: Subject to any disclaimer, the term of this patent is extended or adjusted under 35 U.S.C. 154(b) by 0 days.

(21) Appl. No.: 15/795,925

(22) Filed: Oct. 27, 2017

(51) Int. Cl.
   *B62D 35/00* (2006.01)
(52) U.S. Cl.
   CPC ......... *B62D 35/001* (2013.01); *B62D 35/002* (2013.01); *B62D 35/004* (2013.01)
(58) Field of Classification Search
   CPC ... B62D 35/001; B62D 35/002; B62D 35/004
   USPC ..................................... 296/180.4
   See application file for complete search history.

(56) References Cited

U.S. PATENT DOCUMENTS

| | | |
|---|---|---|
| 609,789 A | 8/1898 | Capewell |
| 2,569,983 A | 10/1951 | Favre |
| 2,737,411 A | 3/1956 | Potter |
| 3,425,740 A | 2/1969 | Vaughn |
| 4,142,755 A | 3/1979 | Keedy |
| 4,236,745 A | 12/1980 | Davis |
| 4,257,641 A | 3/1981 | Keedy |
| 4,451,074 A | 5/1984 | Scanlon |
| 4,508,380 A | 4/1985 | Sankrithi |
| 4,553,781 A | 11/1985 | Johnson |
| 4,601,508 A | 7/1986 | Kerian |
| 4,702,509 A | 10/1987 | Elliott, Sr. |
| 4,741,569 A | 5/1988 | Sutphen |
| 4,978,162 A | 12/1990 | Labbe |
| 5,058,945 A | 10/1991 | Elliott et al. |
| 5,236,347 A | 8/1993 | Andrus |
| 5,348,366 A | 9/1994 | Baker et al. |
| 5,498,059 A | 3/1996 | Switlik |
| 5,823,610 A | 10/1998 | Ryan et al. |

(Continued)

FOREIGN PATENT DOCUMENTS

| | | |
|---|---|---|
| WO | 9200870 | 1/1992 |
| WO | 2007014472 A1 | 2/2007 |
| WO | 2010112204 A1 | 10/2010 |
| WO | 2010148508 A1 | 12/2010 |
| WO | 2012151683 A1 | 11/2012 |

OTHER PUBLICATIONS whichledglight.com; "LED Bulb Shapes and Sizes"; retrieved on Oct. 27, 2017 from https://www.whichledlight.com/bulb-guide/led-bulb-shapes-and-sizes.
bulbs.com; "Light Bulb Shape and Size Chart", retrieved on Jul. 31, 2017 from http://www.bulbs.com/learning/shapesandsizes.aspx.
MadeHow.com; Hot Air Balloon; retrieved on Jul. 31, 2017 from http://www.madehow.com/Volume-3/Hot-Air-Balloon.html.

(Continued)

*Primary Examiner* — Jason S Morrow
(74) *Attorney, Agent, or Firm* — Robert H. Frantz

(57) ABSTRACT

An air flow management system for a rear of a cargo trailer, box car, bus, van, truck, or similar vehicle, having a shaped skin in a three-dimensional surface such as a vertical half of a gas bag envelope of a hot air balloon, and an attachment bracket for the shaped skin to a rear side of the cargo vehicle to reshape and improve the aerodynamics of a vertical planar rear surface of the cargo vehicle by controlling the decompression and expansion of air flow around the rear of the vehicle, which is especially useful for over-the-road cargo trailers having side skirts.

10 Claims, 5 Drawing Sheets

(56) References Cited

U.S. PATENT DOCUMENTS

| | | | |
|---|---|---|---|
| 6,309,010 B1 | 10/2001 | Whitten | |
| 7,618,086 B2 | 11/2009 | Breidengach | |
| 7,740,304 B1 * | 6/2010 | Breu | B62D 35/001 296/180.1 |
| 8,550,539 B1 * | 10/2013 | Anderson | B62D 35/004 296/180.1 |
| 2007/0029837 A1 * | 2/2007 | Vala | B62D 35/004 296/180 |
| 2007/0046066 A1 * | 3/2007 | Cosgrove | B62D 35/001 296/180.4 |
| 2009/0096250 A1 * | 4/2009 | Kohls | B62D 35/001 296/180.4 |
| 2011/0175393 A1 * | 7/2011 | Cline | B60J 1/20 296/180.1 |

OTHER PUBLICATIONS

WolframMathWorld; "Teardrop Curve"; retrieved on Jul. 31, 2017 from http://mathworld.wolfraam.com/TeardrobCurve.html.
Burdett, J.; "Parts of the Light Bulb"; retrieved on Jul. 31, 2017 from http://sciencing.com/parts-light-bulb-5271581.html.
WolframMathWorld; "Pear Curve"; retrieved on Jul. 31, 2017 from http://mathworld.wolfraam.com/PearCurve.html.
WolframMathWorld; "Pear-Shaped Curve"; retrieved on Jul. 31, 2017 from http://mathworld.wolfraam.com/Pear-ShapedCurve.html.
WolframMathWorld; "Piriform Curve"; retrieved on Jul. 31, 2017 from http://mathworld.wolfraam.com/PiriformCurve.html.

* cited by examiner

AERODYNAMIC DRAG REDUCTION SYSTEM FOR TRUCKS, CARGO TRAILERS AND TRAIN BOXCARS

FIELD OF THE INVENTION

The invention generally relates technologies to improve the aerodynamics, handling, and fuel efficiency of box-shaped cargo vehicles.

BACKGROUND OF INVENTION

Trucks, vans, cargo trailers, and even train box cars tend to present a trailing edge which is box-shaped, with a flat vertical tail and four sharp corners meeting a top side, bottom side, left side (driver's side) and right side (passenger's side) of the cargo carrying portion of the vehicle. It is well known that this shape creates substantial aerodynamic drag as the vehicle moves through the air because the air tends to be compressed as it encounters the leading edge of the vehicle (cab, truck, hood/windshield, train engine, etc.), flows around the top, bottom and sides of the vehicle, and then is suddenly allowed to decompress as it passes by the rear corners of the vehicle. This sudden decompression creates an eddy current effect known as cavitation, in which a portion of the air actually travels forward into a zone of lower pressure situated on the rear vertical surface of the vehicle. This causes a pulling backwards on the vertical rear surface, which increases the drag coefficient of the vehicle.

Yet, the flat rear vertical surface of these types of cargo transportation vehicles remain popular because they facilitate docking to a door in a warehouse for easy loading and unloading of the vehicle. Some of these surfaces are configured with two door panels hinged at the outer side edges to swing open, and others are provided with a multi-panel roll-up door that lifts and stores near the interior ceiling of the cargo storage area.

SUMMARY OF THE INVENTION

An air flow management system for a rear of a cargo trailer, box car, bus, van, truck, or similar vehicle, is disclosed, which has a shaped skin in a three-dimensional surface such as a vertical half of a gas bag envelope of a hot air balloon, and an attachment bracket for the shaped skin to a rear side of the cargo vehicle to reshape and improve the aerodynamics of a vertical planar rear surface of the cargo vehicle by controlling the decompression and expansion of air flow around the rear of the vehicle, and which is especially useful for over-the-road cargo trailers having side skirts.

BRIEF DESCRIPTION OF THE DRAWINGS

The description set forth herein is illustrated by the several drawings.

DETAILED DESCRIPTION OF EMBODIMENT(S) OF THE INVENTION

The present inventor has realized that existing add-on systems for the rear vertical surface of cargo trucks, vans, trailers, and train cars fail to meet the needs in the art for one or more of the following generalized reasons:

(1) those which use inflation to create a shape require an inflation means (pump), may deflate during use, causing the skin or envelop to sag and cover the vehicle's tail lights;

(2) those which use a system of planar (flat) panels are difficult to configure and disassemble, and they produce a cavity open to the rear direction of the vehicle in which air may flow and establish eddy currents; and (3) those which use a hemispherical (half-globe) or egg-shape fail to recognize that the air flow around a trailer equipped with side skirts is much different than around a trailer without side skirts.

Figure 7:
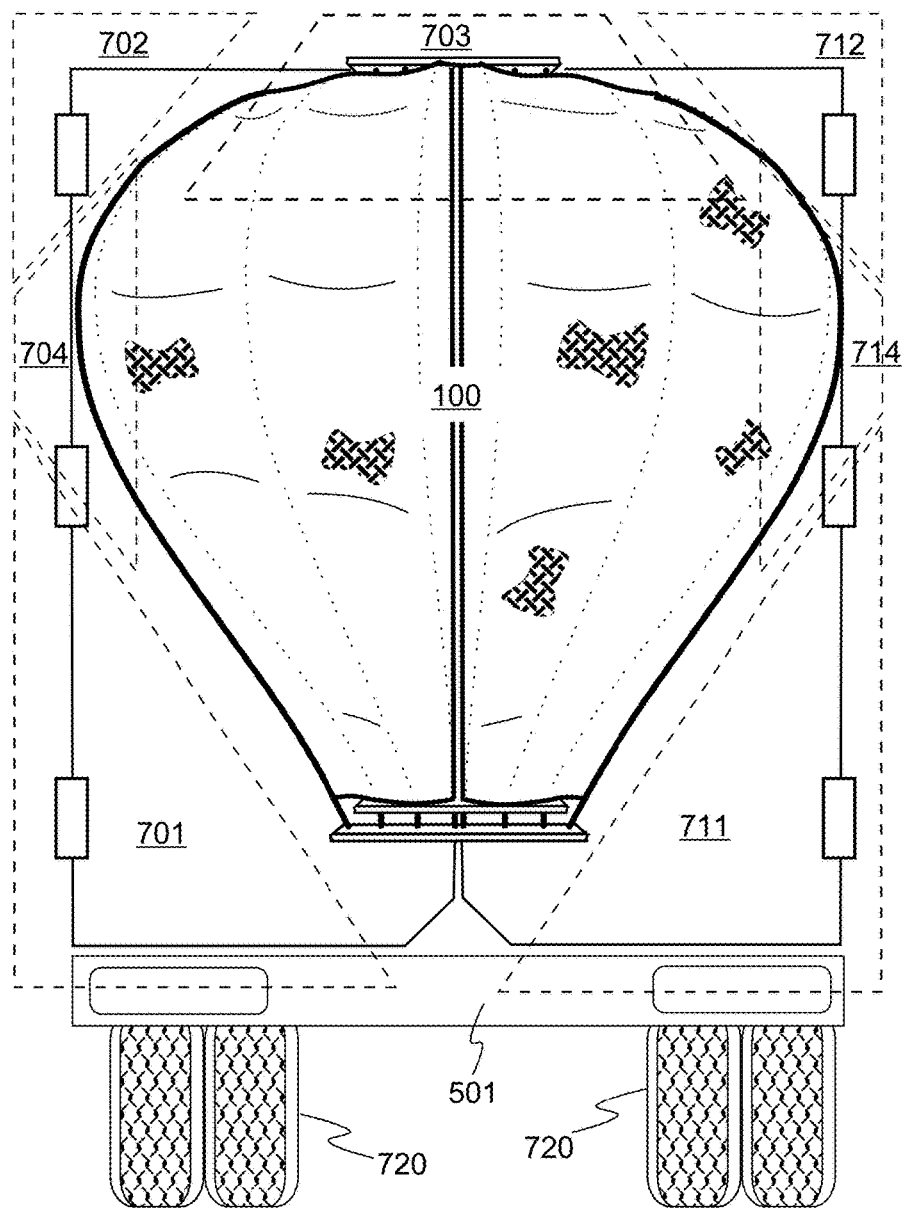
FIG. 7 illustrates zones of wind flow and controlled air decompression of the system in use on a typical box truck or cargo trailer rear door(s).

For these reasons, and because many modern truck trailers are equipped with side skirts between the rear wheels and the hitch, the present inventor has devised an improved system for installation on the rear door(s) of these types of cargo vehicles, or even other large vehicles such as passenger busses, light passenger rail "trolleys" and school busses. Referring now to FIG. 7, the improved contour of the system (100) is in a shape such as that of a "type A" light bulb (i.e., standard incandescent bulb), an inverted teardrop truncated at the bottom, an inverted pear shape truncated at the bottom, an inverted piriform curve truncated at the bottom, or even the shape of a typical envelope (gas bag) of a hot air balloon. This produces 9 zones of controlled decompression of the air flow arriving from the front of the trailer or vehicle. The first two zones are located on the outside edges of the tires (720) and extend to the bottom of the cargo unit, such as approximately the rear bumper (501) of a truck trailer, as shown. Because the trailer wheels (720) are generally in front of the rear vertical surface, and because many trailers are provided with side skirts which have already directed the air around the area below the cargo trailer, this area of decompression occurs several feet in front of the rear vertical surface of the trailer. So, when that portion of the air arrives at the rear of the trailer, it is already decompressed.

The top corner zones (702, 712) and the center top zone (702) are where the compressed air from the top of the trailer and the uppermost portions of the sides of the trailer are decompressed. This air tends to rush diagonally from the corners toward the center of the surface of the system, colliding with each other at the midline of the system. In some configurations, a fin or vertical rudder-like element is provided at the upper section of the horizontal midline of the shape within the area where this collision occurs, thereby disrupting and breaking any vortex that might form there, as will be illustrated and described in the following paragraphs and diagrams.

The center side zones (704, 714) provide controlled decompression of the compressed air flowing along the vertical midline of the sides of the trailer, bus, boxcar, etc.

As this air passes by the cargo box corner, it is allowed to expand in a controlled manner along the curve of the system's envelope.

The lower corner zones (701, 711) provide for a unique improvement in the performance and efficiency of the present system, as illustrated in this exemplary embodiment. In recognition of the fact that the air below the trailer (the first two zones around the tires) is already decompressed, rather than continuing the surface of the system as a bulbous round shape as seen in some existing system, the present invention tapers the shape towards the vertical midline, terminating in a horizontal straight line for the internal structures of the system to connection. In experiments with wind streamers, the present inventor found that the extended (continued) round bulbous shape of the existing systems actually caused additional cavitation (and increased wind drag) on trailers equipped with side skirts. However, wind streamer tests conducted with this tapered and narrowed shape (pear, teardrop, etc.) showed that this cavitation is avoided, especially on trailers equipped with side skirts.

Figure 1:
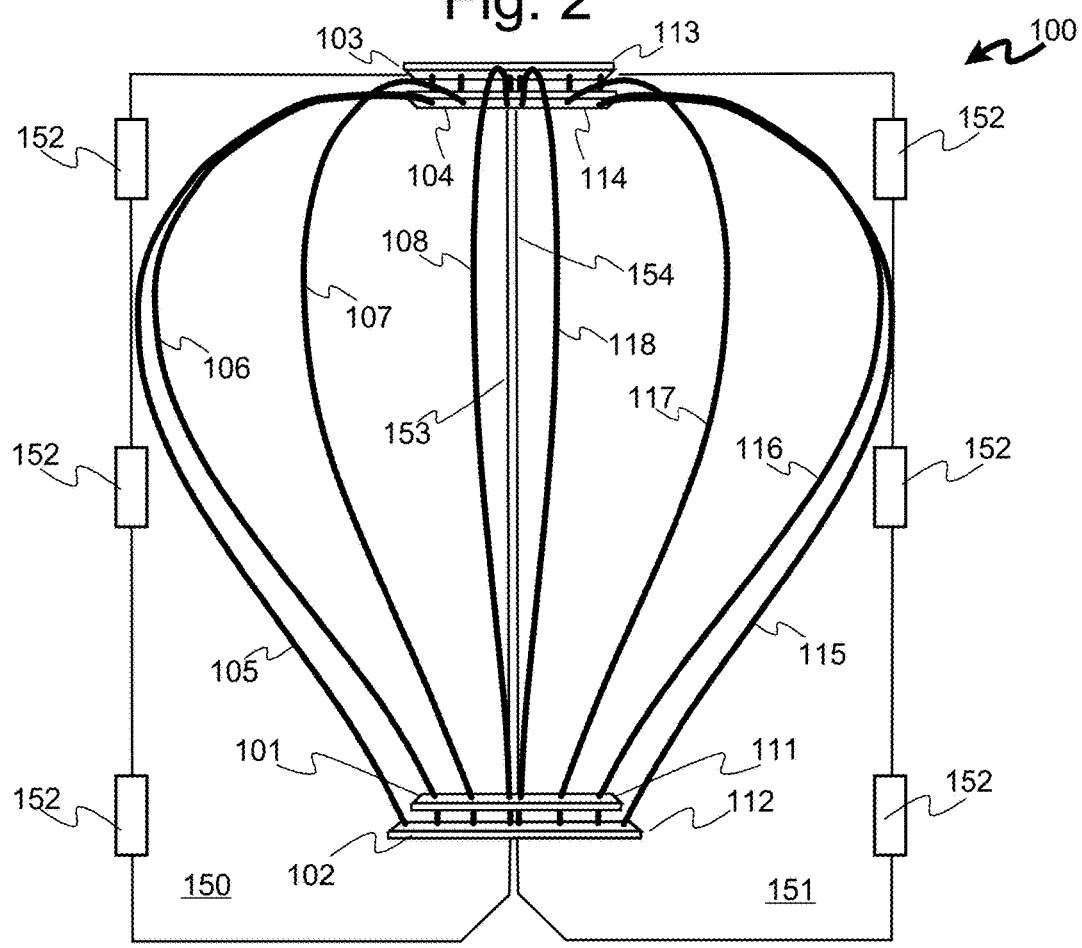
FIG. 1 shows a rear-view perspective of a framework according to the present invention.

The following exemplary embodiment (100) is but one manner in which to make and use the inventive system with the improved performance due to the unique shape of the surface provided as shown in FIG. 7. As illustrated by FIG. 1, from a rear-view perspective, a framework having a set of pseudo-radial vertical ribs (106, 107, 108, 116, 117, 118) are pivotally connected at an upper crossbar (103, 113) and a lower crossbar (101, 102, 111, 112). The ribs may be constructed of any suitable material, and preferably of a lightweight but strong, rust resistant material such as hollow, round aluminum or steel tubing.

The crossbars may be attached directly to the swinging cargo doors on some trailers with side-by-side doors, and on trailers with roll-up doors, the crossbars may be attached to a pair of over-doors attached to hinges (152) for trailers with roll-up doors. The crossbars (101, 102, 103, 11, 112, 113) are preferably also constructed for L-shaped or U-shaped metal stock, such as aluminum or steel stock, and are preferably split into left and segment (not shown to avoid cluttering of the diagram) for attachment to the doors of the trailer or the added over-doors for trailers with roll-up doors.

For example, left upper crossbar (103) and left lower crossbars (101, 102) may be attached to and swing with the left trailer door, and right upper crossbar (113) and right lower crossbars (111, 112) may be attached to and swing with the right trailer door, in some embodiments.

The outer pair of frame members (105, 115) are of a similar shape as the other ribs, however, they are not required to pivot to facilitate opening and closing of the cargo doors, so they may be immovably attached to the trailer cargo doors or the optional over-doors.

Figure 2:
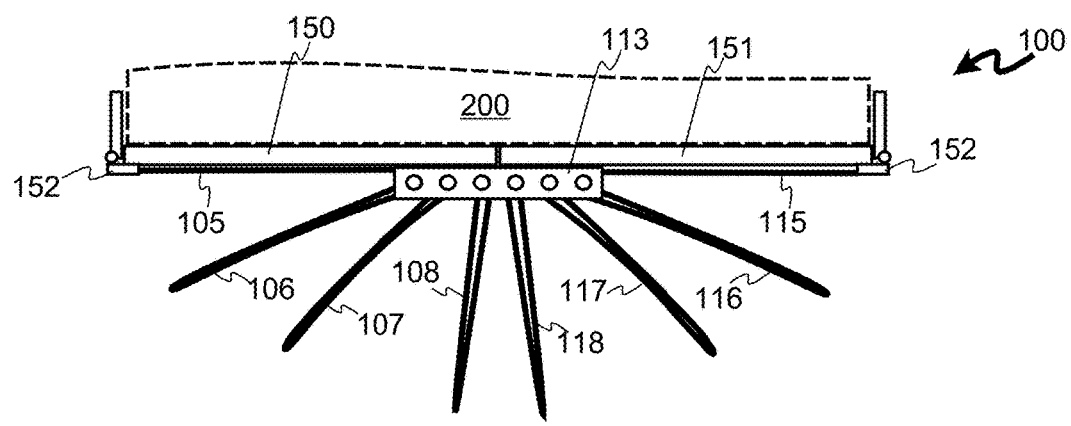
FIG. 2 shows the arrangement of FIG. 1 from a top view.

FIG. 2 shows the arrangement of FIG. 1 from a top view, including a rear portion (200) of the cargo vehicle to be improved through the usage of the present system. This depiction shows the vertical ribs in a pseudo-radial position (e.g., fanned out) as they would be in a deployed configuration during travel of the vehicle. During loading and unloading of the vehicle, the ribs pivot way from the center of the trailer, collapsing the system similarly to a convertible top of a car or a tent. After loading is complete, the ribs are pivoted into the fanned-out position shown, thereby stretching a flexible skin (not shown) to create the innovative aerodynamic surface of FIG. 7

Figure 3:
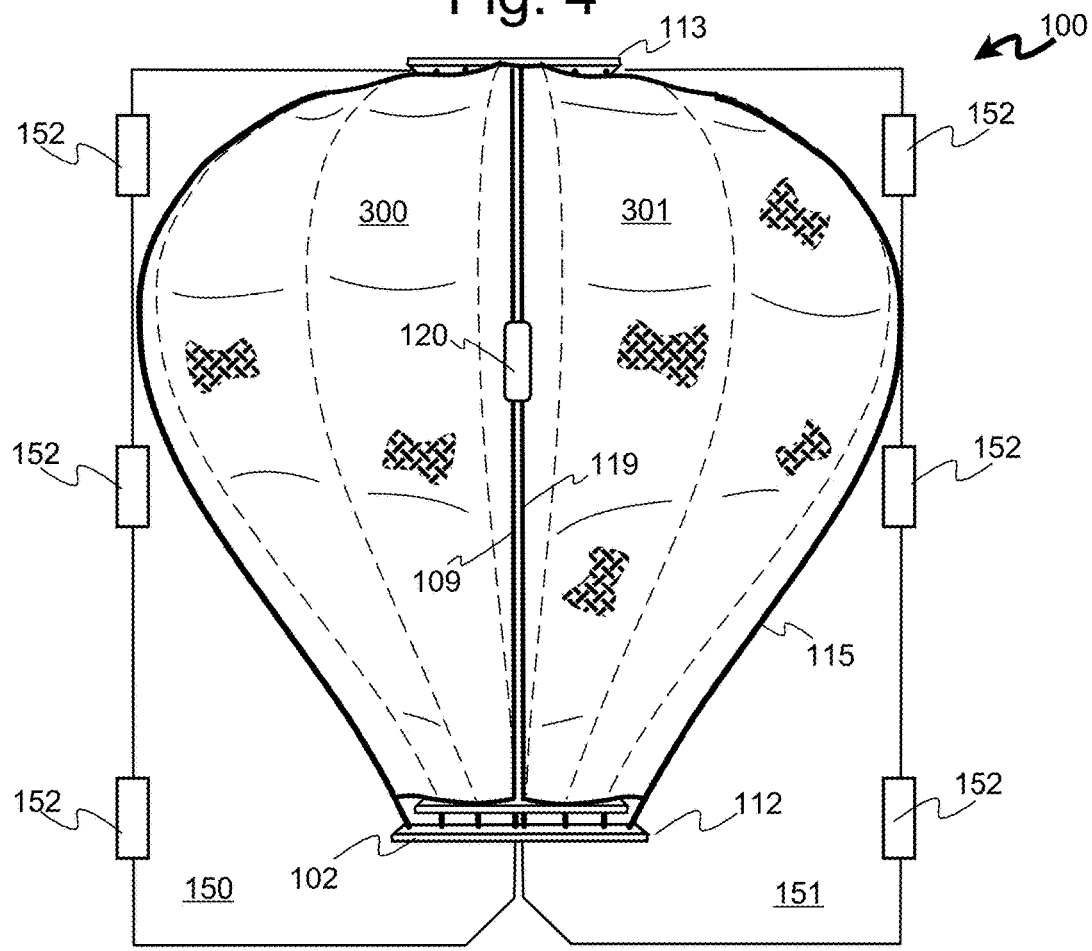
FIG. 3 shows the arrangement of FIG. 1 with the left and right skins installed on the ribs in a closed configuration.

FIG. 3 shows the arrangement of FIG. 1 in which view of the ribs are obscured by an added left skin (300) and a right skin (301). The skin may be constructed of any suitably strong and lightweight material, such as the same tarpaulin material used to cover loads on cargo flatbed trailers. One such material is polyvinyl chloride (PVC) coated polyester with ultra-violet (UV) light damage protection, and waterproofed seams. Sleeves may be sewn between adjacent panels to receive the ribs, and the panels can be cut to yield an approximate shape as shown in FIG. 7, similar to a scaled-down pattern for an envelope for a hot air balloon. Edges can be reinforced with nylon webbing to prevent tearing, and brass grommets may be used where fastening hardware is necessary to attach the skin to the immovable frame members (105, 115).

The skins (300, 301) may be installed over the ribs such that, when in a closed configuration, an aerodynamic surface defining an envelope having the aforementioned shape of a "type A" light bulb, truncated inverted teardrop, truncated inverted pear shape, inverted truncated piriform curve, or a typical hot air balloon envelope (gas bag) is produced and maintained in place under the negative air pressures typical of the vehicle travelling at typical speeds for that mode of transportation.

Figure 4:
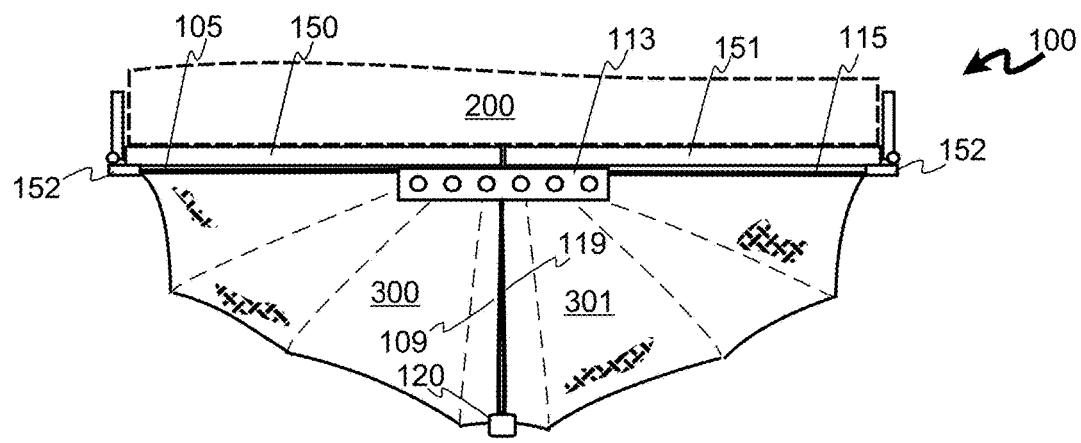
FIG. 4 depicts the configuration of FIG. 3 from a top view.

Referring now to FIG. 4, the configuration of FIG. 3 is illustrated from a top view angle. In this figure and in FIG. 3, the center edges (109, 119) are shown held together by a closure means (120), with the skins (300, 301) stretched into shape. The closure means can take the form of a variety of mechanisms, and may require internal components (not shown) to connect the skins to each other at heights which are above the reach of a typical person standing on the ground. For example, internal rods, cables, pulleys, latches, etc., may be provided to allow a person to engage and disengage the top portion of the closure without using a ladder.

Figure 5:
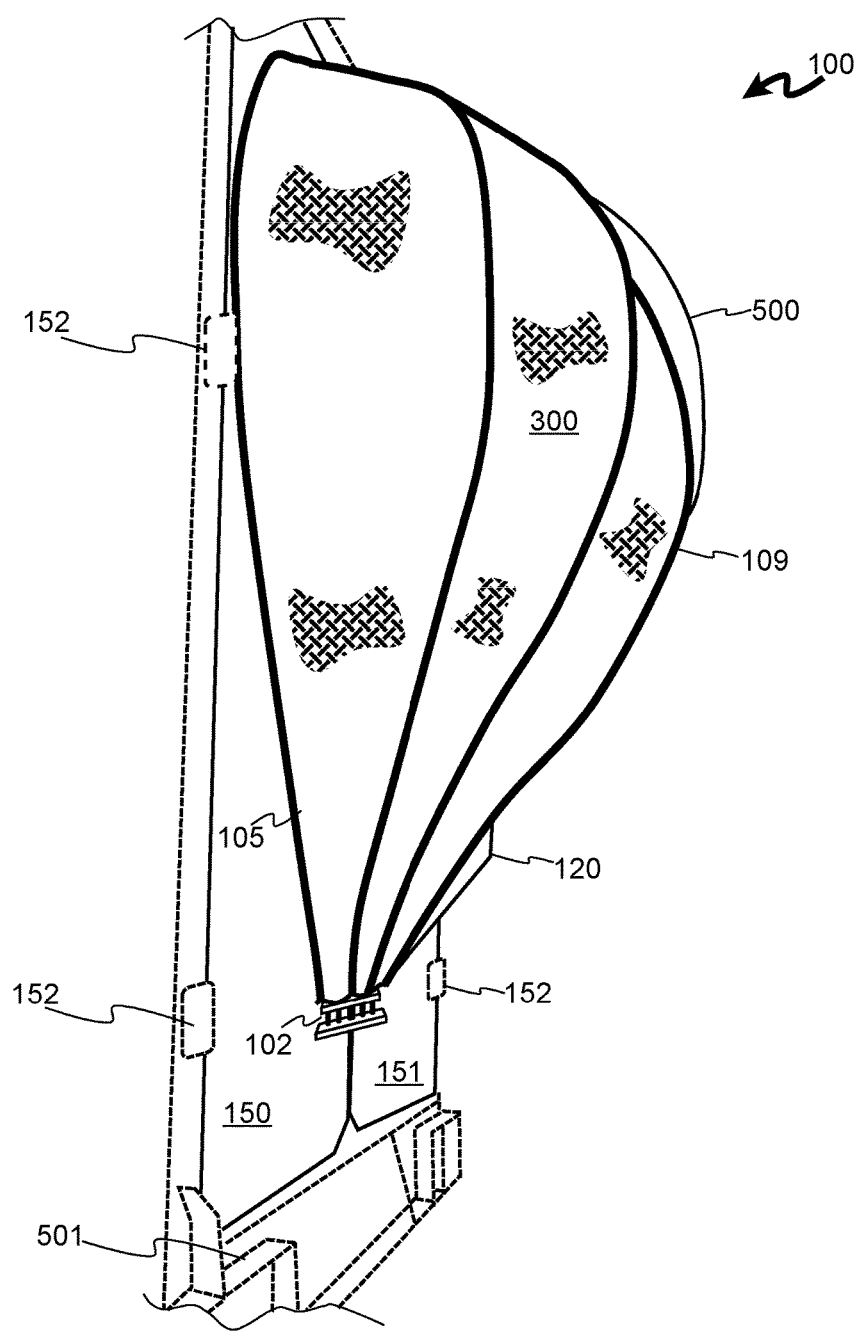
FIG. 5 shows a pseudo-isometric view of a prototype of one embodiment of the invention as seen from the left (passenger's) side of the rear of an over-the-road (OTR) cargo trailer.
Figure 6:
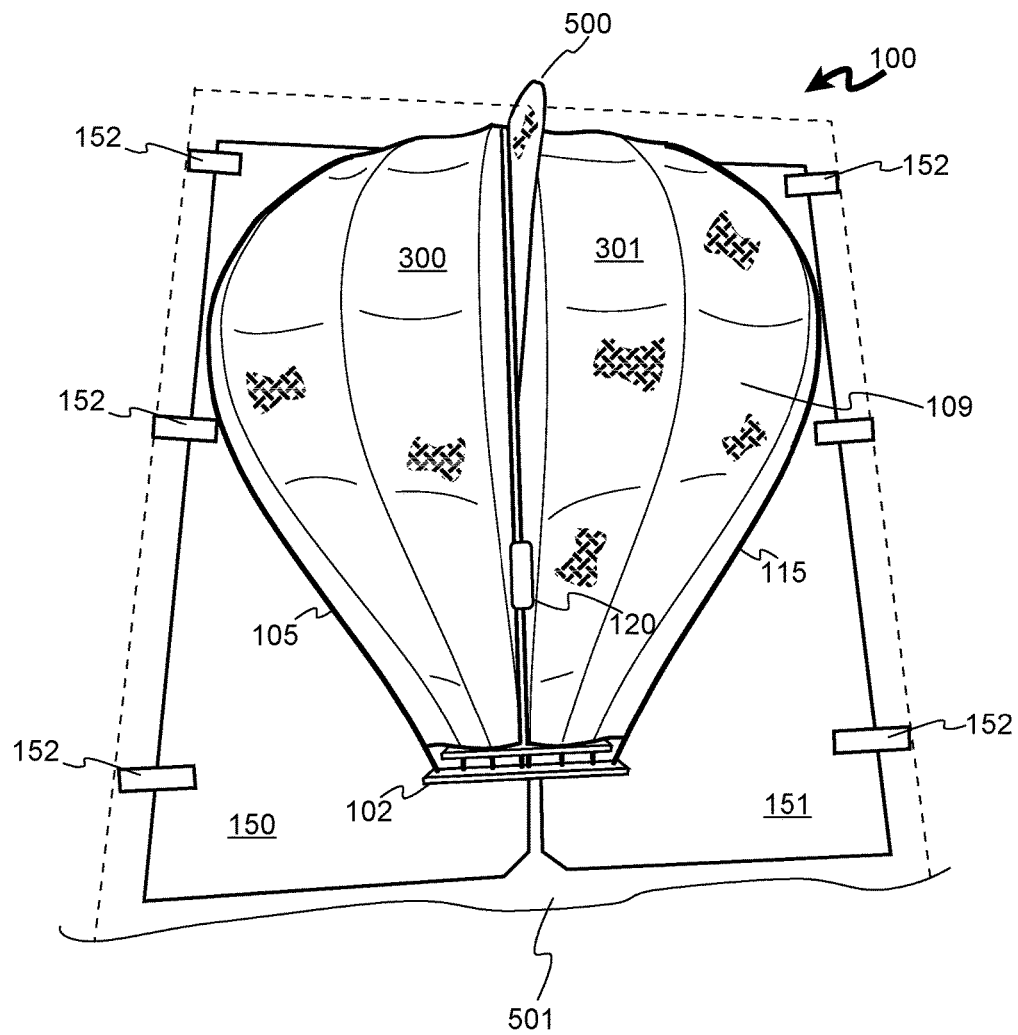
FIG. 6 shows the prototype of FIG. 5 from a rear and slightly below perspective (looking slightly upwards), also showing the optional vortex breaker (500).

FIG. 5 shows a pseudo-isometric photographic view of a prototype of one embodiment of the invention as seen from the left (passenger's) side of the rear of an over-the-road (OTR) cargo trailer. A portion of the trailer's rear bumper (501), several hinges (152) of the trailer doors (or roll-up door adapter panels) are visible for orienting the structure of the prototype (100) to the rear of the trailer. One can see the depth of the shape provided in this prototype, as well. Additionally, an optional vortex breaker element (500) is shown for breaking a vortex which may form from the collision of the air arriving from the two top corners (702, 712). The vortex breaker can be made from a cut-to-shape portion of plywood, fiberglass, aluminum, etc., and optionally covered and encapsulated with more of the skin material. FIG. 6 shows the prototype of FIG. 5 from a rear and slightly below perspective (looking slightly upwards), also showing the optional vortex breaker (500).

Embodiment Variations

The foregoing exemplary embodiment using a swing-away frame having a plurality of pivoting ribs is but one available embodiment according to the spirit and scope of the present invention. The general shape disclosed in FIG. 7 which uniquely provides the two decompression zones (701, 711) adjacent to the lower tapered portion of the shaped skin can be achieved through other mechanical means of manufacturing and assembly, such as a rigid member (or members) made of rigid plastic, fiberglass, aluminum, graphite composites, and even inflated vinyl. While each of these variations may offer certain advantages over the frame-based embodiment, such as fewer components and less complexity of operation, they may also offer disadvantages with respect to docking and unloading procedures, weight, and adaptability to a variety of cargo vehicles. It is, however, within the skill of those in the art to modify and change the exemplary embodiments of the present invention, in view of the present disclosure, as required for different vehicles and operational scenarios. Such modifications, alterations, adjustments and improvements are within the spirit and scope of the present invention.

CONCLUSION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. An air flow management system comprising:
a shaped skin having a three-dimensional surface selected from the group consisting of a vertical half of a type-A incandescent light bulb, a vertical half of an inverted teardrop truncated at a bottom edge, a vertical half of an inverted pear shape truncated at a bottom edge, a vertical half of an inverted piriform curve truncated at a bottom edge, and a vertical half of a gas bag envelope of a hot air balloon;
a plurality of vertical ribs providing structural support and shape to the shaped skin, wherein the skin is stretched across the plurality of ribs; and
an attachment bracket for the shaped skin to a vertical planar rear surface of a cargo vehicle, thereby aerodynamically modifying a portion of the planar surface with the three-dimensional surface;
wherein the shaped skin is impermeable to air flow, wherein the shaped skin is substantially incompressible under air pressure during transit of the cargo vehicle, wherein the shaped skin is dimensioned with respect to the vertical planar rear surface to yield a plurality of zones of controlled air flow decompression arriving from a front of the cargo vehicle, and wherein the zones include at least a right lower corner zone and a left lower corner zone adjacent to vertically-tapered lower edges of the shape of the skin.

2. The air flow management system as set forth in claim 1 further comprising a vortex breaker fin component extending orthogonally from an upper horizontal midpoint of the shaped skin adjacent to a top edge of the vertical planar rear surface of the cargo vehicle, thereby providing an air-impermeable divider between decompressing air flow arriving from an upper right corner decompression zone and an upper left corner decompression zone.

3. The air flow management system as set forth in claim 1 wherein the attachment bracket comprises:
an upper crossbar affixed near an upper edge of the vertical planar rear surface of the cargo vehicle; and
a lower crossbar affixed towards a lower edge of the vertical planar rear surface of the cargo vehicle; and
wherein the plurality of vertical ribs extend between the upper crossbar and the lower cross bar.

4. The air flow management system as set forth in claim 1 wherein the plurality of vertical ribs are pivotally attached to the upper and lower crossbars.

5. The air flow management system as set forth in claim 4 wherein the pivotal attachment of the vertical ribs to the upper and lower crossbars is pseudo-radial.

6. The air flow management system as set forth in claim 3 wherein the upper and lower crossbars each comprise a left cross bar component and a right cross bar component, wherein the attachment bracket comprises an attachment for the left components to a left swinging door and an attachment for the right components to a right swinging door.

7. The air flow management system as set forth in claim 6 wherein the left swinging door and the right swinging door comprise doors of the cargo vehicle.

8. The air flow management system as set forth in claim 6 wherein the left swinging door and the right swinging door comprise over-doors which cover a roll-up door of the cargo vehicle.

9. The air flow management system as set forth in claim 1 wherein the shaped skin is vertically divided into a left shaped skin component and a right shaped skin component to allow for opening and access through the vertical planar surface of the cargo vehicle.

10. The air flow management system as set forth in claim 4 wherein the shaped skin is vertically divided into a left shaped skin component and a right shaped skin component to allow for opening and access through the vertical planar surface of the cargo vehicle by pivoting a portion of the plurality of vertical ribs towards a left-most position, and by pivoting a portion of the plurality of vertical ribs towards a right-most position, thereby collapsing the shaped skin against the vertical planar surface of the cargo vehicle to allow for docking of the cargo vehicle at the vertical planar surface.

* * * * *